Sept. 20, 1971  J. F. YURASEK ET AL  3,606,537
LASER RANGING SYSTEM USING MAGNETOSTRICTIVE DELAY LINE
Filed Dec. 9, 1968  2 Sheets-Sheet 1

INVENTORS
JOHN F. YURASEK
ARTHUR SIMON
BY
ATTORNEY

INVENTORS
JOHN F. YURASEK
ARTHUR SIMON

United States Patent Office 3,606,537
Patented Sept. 20, 1971

3,606,537
LASER RANGING SYSTEM USING MAGNETO-STRICTIVE DELAY LINE
John F. Yurasek, Passaic, and Arthur Simon, Fair Lawn, N.J., assignors to The Bendix Corporation
Filed Dec. 9, 1968, Ser. No. 782,378
Int. Cl. G01c 3/08
U.S. Cl. 356—5      5 Claims

ABSTRACT OF THE DISCLOSURE

A system using a magnetostrictive delay line for converting the interval between pulses corresponding to the firing of a laser beam at a target and corresponding rebound pulses into a target range indication. The interval between the laser firing and rebound pulses is compared to the delay line interval and a motor is driven in response to the difference between the intervals for automatically tracking the target. A position sensor connected to the motor shaft senses target range information for providing a continuous target range display.

CROSS REFERENCE TO RELATED APPLICATIONS

The system of the present invention is related to U.S. application Ser. No. 763,865, filed Sept. 30, 1968, by John F. Yurasek and Arthur Simon and U.S. application Ser. No. 17,036, filed Mar. 9, 1970, by John F. Yurasek, Roger Talish and David Tawfik, both of which applications are assigned to The Bendix Corporation, assignee of the present invention. The foregoing applications disclose and claim electronic laser ranging means while the present invention is directed to laser ranging means using electromechanical apparatus.

BACKGROUND OF THE INVENTION

Field of the invention

This invention relates to systems for indicating target range and, more particularly, to systems of the type described using a magnetostrictive delay line whereby the interval between laser firing and rebound pulses is converted to target range indication such as may be required for aircraft navigation or ballistics purposes.

Description of the prior art

While laser ranging devices using electronic means are known in the art, it may be desirable for some applications to have a device using electromechanical means. Heretofore, electromechanical devices have not provided the required accuracy and have not incorporated an added feature of the present invention whereby the magnetostrictive delay line is effective for storing target range information.

SUMMARY OF THE INVENTION

The present invention provides a closed loop system which automatically tracks target motion. The time between laser firing and rebound pulses is compared to the delay time of a reference pulse as it progresses along an adjustable magnetostrictive delay line, and a stepping motor which is activated in response to the difference between the compared times drives the delay line to time or phase coincidence. When coincidence is established, the stepping motor pulses the delay line to automatically track the target. A precision potentiometer is used as a position sensor and the D.C. range voltage provided thereby is displayed, via operational amplifiers, on a pair of meters. One of the meters indicates full scale range and the other indicates expanded scale range indicating target range to an arbitrary preset range point.

One object of this invention is to provide accurate electromechanical means for converting the interval between the laser firing and rebound pulse to target range display.

Another object of this invention is to provide a closed loop system for automatically tracking target motion.

Another object of this invention is to compare the interval between the laser firing and rebound pulses to the delay interval of a reference pulse as it progresses along an adjustable magnetostrictive delay line, and to drive the delay line to time or phase coincidence as a function of the comparison.

Another object of this invention is to provide a stepping motor for pulsing the delay line to automatically track target motion after coincidence is established.

Another object of this invention is to display full scale target range and expanded scale range indicating target range to an arbitrary preset range point.

Another object of this invention is to provide means for storing target range information.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
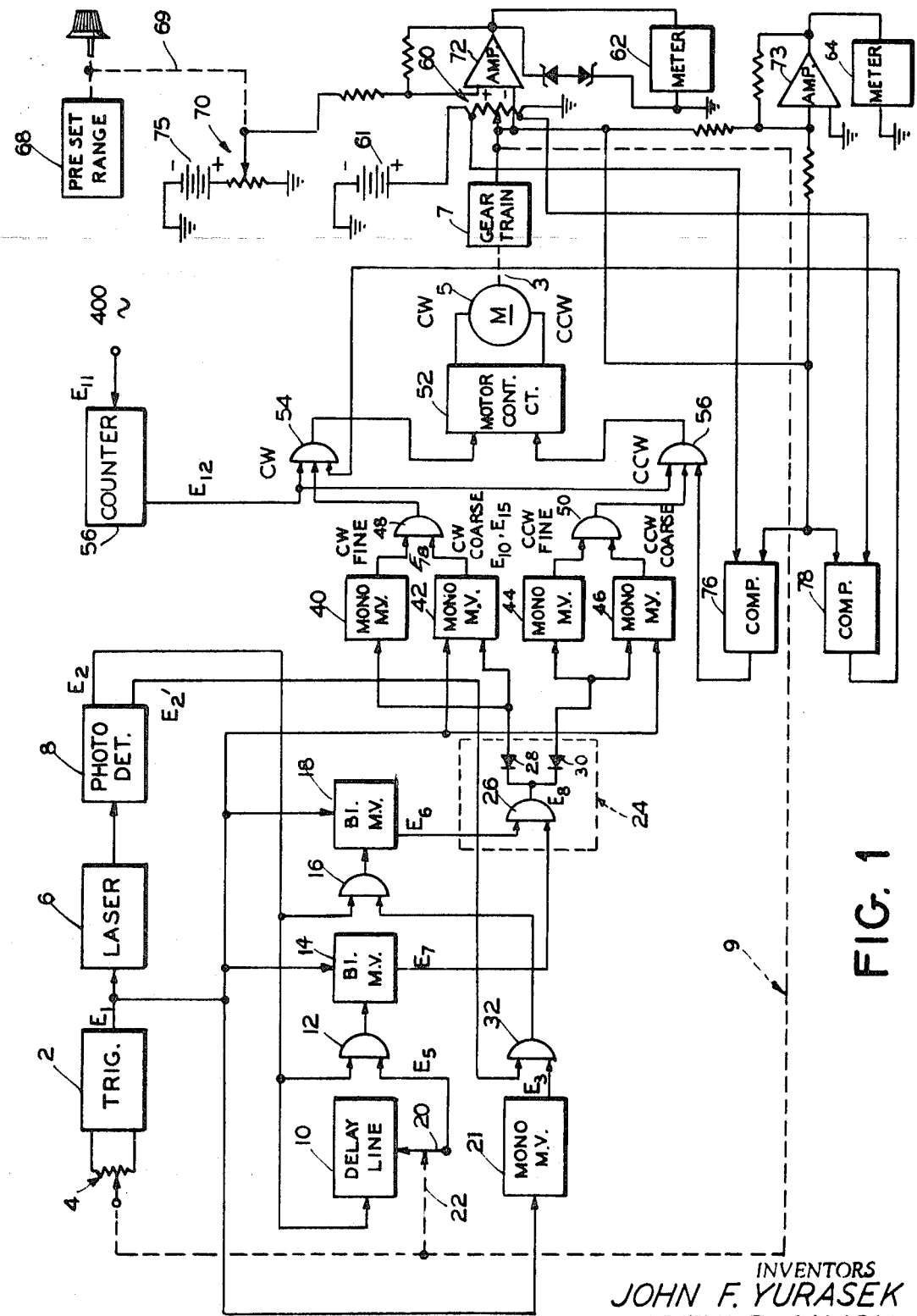
FIG. 1 is a block diagram of the system of the present invention.
Figure 2:
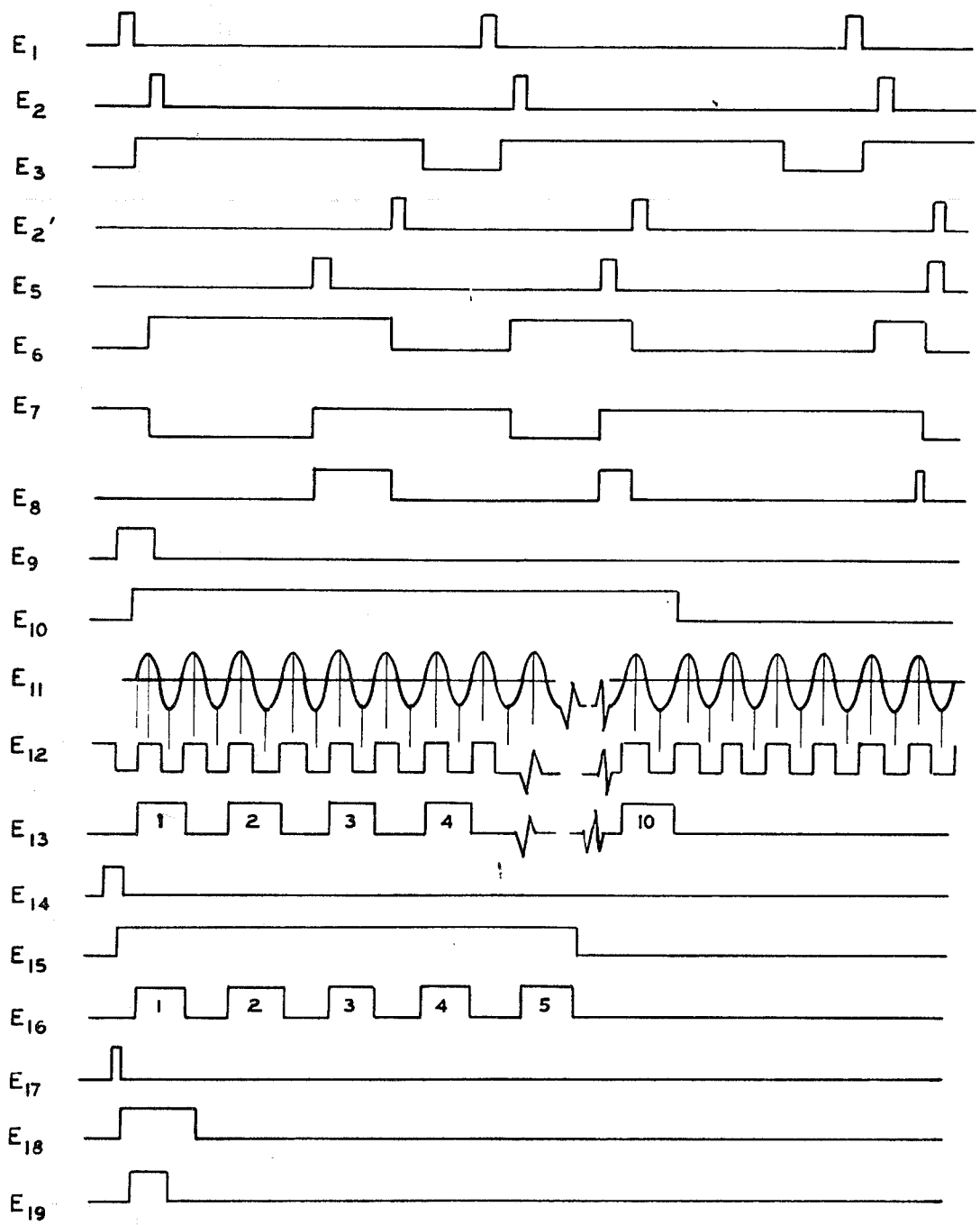
FIG. 2 is a graphical representation showing waveforms and timing relationships of pulses provided at various stages of operation of the system shown in FIG. 1.

With reference to FIG. 1, a trigger 2 which may be, for purposes of example, a unijunction transistor oscillator operating at an automatically adjustable frequency range of 0.4 to 40 cycles per second provides a basic system timing pulse $E_1$ having a waveform as shown in the graphical representation of FIG. 2. A potentiometer 4 is connected to trigger 2 and is coupled to an output shaft 3 of a stepping motor 5 through a gear train 7 and suitable mechanical means 9 for providing automatic adjustment of trigger 2 to provide a higher range data rate for shorter ranges as will hereinafter become evident.

Pulse $E_1$ is applied to a laser device 6 which may be mounted on an aircraft and boresighted with the longitudinal axis of the craft for aiming at a predetermined target. It is desired to determine the range of the target for navigation or ballistics purposes. Pulse $E_1$ is applied to a monostable multivibrator 21 which provides a pulse $E_3$ having a waveform as shown in FIG. 2, and which pulse $E_3$ is used to reset logic circuitry and synchronize a noise immunization gate 32. Pulse $E_1$ is applied to a bistable multivibrator 14, a bistable multivibrator 18, a monostable multivibrator 42 and a monostable multivibrator 46.

Approximately 100 microseconds after laser device 6 receives pulse $E_1$, the laser device fires and a sample of the firing energy is sensed by a photodetector 8 which may be, for purposes of example, a solid state photodiode or a photomultiplier tube for providing a laser firing pulse $E_2$ having a waveform as shown in FIG. 2. The laser energy strikes the predetermined target and rebounds therefrom so that several microseconds later the rebound energy is sensed by photodetector 8 for providing a rebound pulse $E_2'$ having a waveform as shown in FIG. 2.

Laser firing pulse $E_2$ is applied to an adjustable magnetostrictive delay line 10 and is applied through a gate 12 to bistable multivibrator 14 and through a gate 16 to bistable multivibrator 18. Laser rebound pulse $E_2'$ is applied to gate 32.

Magnetostrictive delay line 10 is a device known in the art and includes a ferro magnetic bar (not shown) placed in a magnetic field extending axially of the bar. The bar is subjected to a change in dimension due to the magnetostrictive effect upon delay line 10 receiving an electrical signal. Accordingly, a completely rigid arrangement devoid of moving parts and providing a defined dimensional change when delay line 10 receives laser firing pulse $E_2$ above a predetermined threshold is established.

Through this arrangement, delay line 10 provides at a pickoff 20 a pulse $E_5$ after an interval proportional to the length of the propagating medium. Pulse $E_5$ has a waveform as shown in figure 2 and which pulse $E_5$ is applied to gate 12. Pickoff 20 may be of the slide wire type driven by a precision lead screw 22 coupled to output shaft 3 of motor 5 through means 9 for permitting the time delay of delay line 10 to be adjusted by mechanical rotation of lead screw 22 in response to movement of motor shaft 3 as will be hereinafter explained.

Firing pulse $E_2$ is applied to bistable multivibrator 14 and to bistable multivibrator 18 as heretofore noted. Multivibrators 14 and 18, which are reset to identical reference states (zero volts) by pulse $E_1$ from trigger 2 are set by laser firing pulse $E_2$ to their active states. The active state for multivibrator 14 may be, for example, $-10$ volts while the active state for multivibrator 18 is $+10$ volts. Multivibrator 14 provides a pulse $E_7$ and multivibrator 18 provides a pulse $E_6$, with pulses $E_7$ and $E_6$ having waveforms as shown in FIG. 2.

Pulse $E_7$ from multivibrator 14 and pulse $E_6$ from multivibrator 18 are applied to a gate 26 included in a bipolar error detector designated generally by the numeral 24. Error detector 24 also includes a pair of diodes 28 and 30 connected to the output of gate 26. Gate 26 provides an error pulse $E_8$ having a waveform as shown in FIG. 2, and which pulse $E_8$ indicates whether the time delay of delay line 10 is greater than, less than or equal to the time delay between laser firing and rebound pulses $E_2$ and $E_2'$, respectively. In this connection it is to be noted that the width of pulse $E_8$ narrows as the target is approached. Thus, with reference to FIG. 2, pulse $E_9$ represents the error pulse when the target is first picked up, pulses $E_{14}$ represents the error pulse as the target is being "closed" upon and pulse $E_{17}$ represents the error pulse at final target "lock-on." Error detector 24 is arranged to provide a digital type pulse $E_8$ in three states: a positive state ($+10$ volts), a negative state ($-10$ volts) and a coincidence or null state (0 volts), with the positive and null states of pulse $E_8$ being shown in FIG. 2. It is significant to note that pulse $E_8$ is a digital type pulse; i.e., information is provided in accordance with the width and polarity of the pulse. Bipolar error detector 24 operates on a pulse basis; that is, it is reset to its null or zero condition at the system trigger firing time as may be seen by comparing the waveform of pulse $E_8$ to the waveforms of pulses $E_6$ and $E_7$. When laser device 6 fires, both multivibrator 18 and multivibrator 14 are triggered to their active states ($-10$ volts and $+10$ volts, respectively) and the output of bipolar error detector 24 is at its zero or null state.

Assuming that delay line 10 is set at a position representing a time delay less than the difference between laser firing pulse $E_2$ and rebound pulse $E_2'$, laser firing pulse $E_2$ appears at the output of delay line 10 and hence at the input to multivibrator 14 before laser return pulse $E_2'$ arrives at the input to multivibrator 18 via gate 32 and gate 16. Multivibrator 14 thus fires first and its output pulse $E_7$ returns from $-10$ volts to 0 volts. Output pulse $E_8$ from gate 26 in bipolar error detector 24 increases from its zero volt state to $+10$ volts. Pulse $E_8$ is channeled through diode 28, a monostable multivibrator 40, monostable multivibrator 42, a gate 48, a gate 54 and a motor control circuit 52 for clockwise (CW) control of motor 5. It is to be noted that if the magnetostrictive delay line 10 had been set at a position representing a time delay greater than the laser pulse propagation time, multivibrator 18 would fire first and hence output pulse $E_8$ of gate 26 in error detector 24 would switch from 0 to $-10$ volts. In this latter event pulse $E_8$ is channeled through diode 30, a monostable multivibrator 44, monostable multivibrator 46, gate 50, a gate 56 and motor control circuit 52 for counterclockwise (CCW) control of motor 5.

If it is considered that the time delay of delay line 10 with respect to the difference between laser firing and rebound pulses $E_2$ and $E_2'$, respectively, is quite large, error pulse $E_8$ is generated at the output of gate 26 of bipolar error detector 24 and channeled through diode 28 to motor control circuit 52 Since the error pulse is large, multivibrator 42 is enabled and generates a pulse $E_{10}$ having a waveform as shown in FIG 2, and which pulse $E_{10}$ may be, for purposes of example, 50 milliseconds wide. Pulse $E_{10}$ gates motor drive pulses through to motor 5 for driving the motor. The motor pulses are generated by dividing a 400 cycle per second line voltage $E_{11}$ having a waveform as shown in FIG. 2 by a factor of 2 in a binary counter 56. Counter 56 provides a pulse train $E_{12}$ having a waveform as shown in FIG. 2.

Thus, during the 50 millisecond gate (pulse $E_{10}$ in FIG. 2) ten pulses at 200 cycles per second pass to motor control circuit 52, and which pulses have a waveform designated as $E_{13}$ in FIG. 2. Stepper motor 5 makes ten 15° rotational steps, and which rotational steps are coupled to delay line 10 through gear train, suitable mechanical means 9 and precision lead screw 22. Delay line 10 is thus moved in a direction to establish coincidence between the termination of pulses $E_7$ and $E_6$ from multivibrators 14 and 18, respectively. If an excessive error still exists after ten drive pulses $E_{13}$ are generated, an error pulse $E_8$ will again be provided at the output of gate 26 of bipolar error detector 24 at the next laser firing time. In this event, 10 additional motor pulses are generated and magnetostrictive delay 10 will again be driven toward the aforementioned coincidence As the distance from the aircraft to the target diminishes, the firing rate of trigger 2 and hence the firing rate of laser 6 increases As heretofore noted, this action is controlled by a potentiometer 4 coupled through mechanical means 9 and gear train 7 to the output shaft 3 of motor 5. When laser 6 is firing at a rate of, for purposes of example, 40 times per second, sufficient time is not available to permit pulse train $E_{13}$ providing 10 pulses at 200 cycles per second to pass through multivibrator 42 for driving motor 5.

This problem is overcome by pretriggering multivibrator 42 and thus restricting its period. Thus, the arrangement is such that multivibrator 42 is restricted to generate a pulse $E_{15}$ having a waveform as shown in FIG. 2, and only 5 pulses, for examples, will be generated by multivibrator 42 for driving motor 5, and which pulses have waveform designated as $E_{16}$ in FIG. 2.

As final "lock on" to the target is approached (refer to waveforms $E_9$, $E_{14}$ and $E_{17}$ in FIG. 2) the width of error pulse $E_8$ decreases as shown in FIG. 2. That is, it becomes less than 1 microsecond. When this occurs, a low pass filter (not shown) included in the output circuit of multivibrator 42 inhibits operation of the multivibrator. Multivibrator 40, which has been operating in a redundant fashion now controls system operation. Thus, a two speed type system is achieved by use of the coarse and fine multivibrators 42 and 40, respectively. In this connection it is to be noted that an obvious extension of the two speed system is a multispeed system with additional multivibrators being provided for each channel in the multispeed system.

Monostable multivibrator 40 provides a pulse $E_{18}$ having a waveform as shown in FIG. 2. Pulse $E_{18}$ is just wide enough to permit one 200 cycle per second motor drive pulse $E_{19}$ to drive motor 5, and which drive pulse $E_{19}$ has a waveform as shown in FIG. 2. Should the apparent target range increase due to aircraft and target evasive action, gate 26 in bipolar error detector 24 will generate a negative error pulse $E_8$. Counterclockwise (CCW) logic circuitry, including multivibrators 44 and 46 and gates 50 and 54 which is identical to the clockwise (CW) logic circuitry including multivibrators 40 and 42 and gates 48 and 54, will be activated and motor 5 will reverse rotation to re-establish target lock-on.

Stepper motor 41 may be arranged to provide an angular rotation of 15° each time it is pulsed as has been heretofore mentioned. If it is considered that delay line 10 is a ten turn adjustable magnetostrictive delay line having a delay 40 microseconds long (i.e. 4 microseconds per turn) each 15° rotation of motor 5 corresponds to 166 nanoseconds, $$\left[4000 \text{ nanoseconds} \times \frac{150}{3600°}\right]$$

or a resolution of 82 feet $$(0.166 \text{ microsecond}) \times \left[\frac{492 \text{ feet}}{1 \text{ microsecond}}\right]$$

This 82-foot resolution can be reduced by changing the speed reduction of gear train 7. As an example a 10:1 speed reduction will provide the system with a resolution of 8.2 feet.

A 10-turn potentiometer 60 is connected to gear train 7 and to a suitable source of direct current shown as a battery 61 for providing a signal corresponding to target range. The signal corresponding to range is applied through an amplifier 72 to a meter 62 and through an amplifier 73 to a meter 64. Meter 64 indicates absolute range while meter 62 indicates differential range to a preset target. Preset range to target is introduced into the system through a manually adjustable dial 68 connected by suitable mechanical means 69 to a potentiometer 70. Potentiometer 70 is connected to a suitable source of direct current shown as a battery 75 and provides a D.C. voltage proportional to preset range. This voltage is subtracted from the actual range voltage by amplifier 72.

Additional taps on potentiometers 60 may be used to prevent overdriving of delay line 10 by motor 5. Thus, potentiometer 60 is connected to a comparator 76 and to a comparator 78. Comparator 78 is connected to gate 54 in the clockwise motor control channel and comparator 76 is connected to gate 56 in the counterclockwise control channel. When the system is overdriving in the clockwise (CW) direction, for example, comparator 78 will be triggered for applying a controlling output to gate 54 for preventing the transmission of additional drive pulses. However, should input pulses occur to drive the system to the center of its range (i.e. counterclockwise pulses) the system will respond properly. In a similar manner, comparator 76 provides a controlling output to gate 56 for preventing overdrive in a counterclockwise direction.

The active duty cycle of the system of the present invention, that is the ratio of the time during which usable information is expected to the period between laser firing and rebound pulses $E_2$ and $E_2'$ is extremely low. For example, for a maximum target detection range of 20,000 feet and a laser pulsing rate of 4 cycles per second the active duty cycle is 40 μsec.÷250,000 μsec. or approximately 1 part in 6,000. Range gating in such a situation is indicated and easily instrumented by inhibiting the transmission of laser rebound pulse $E_2'$ to multivibrator 18 during all but a 100 microsecond interval around the laser firing time. This inhibiting is accomplished by pulse $E_3$ provided by multivibrator 21. Pulse $E_1$ fires monostable multivibrator 21 which, when fired, provides pulse $E_3$ for enabling gate 32 thereby rendering multivibrator 18 sensitive to pulses $E_2'$ from photodetector 8.

In this connection it is to be noted that this range gating feature of the invention provides an effective signal-to-noise ratio improvement of greater than 60 db. This is especially important in reducing system degradation due to occasional high amplitude noise spikes characteristic of photomultiplier tubes (photodetector 8) employing IR sensitive phosphors.

The device of the present invention may sample target range at a 4-cycle per second rate and hold this value of target range for a rather long interpulse sampling period of 0.25 second. Accordingly, some auxiliary up-dating and smoothing of the range data during the interpulse period is required to prevent an undesirable display ripple. Techniques for this data smoothing fall into the two general categories; external augmentation or internal augmentation. A discussion of these augmentation techniques is provided in the aforenoted copending U.S. application Ser. No. 763,865 and it is to be understood that these techniques are applicable to the device of the present invention as well.

The device of the present invention provides a unique highly accurate electromagnetic laser ranging system employing magnetostrictive phenomenon. Range gating is provided for noise immunization and introduction of a preset range is provided. The system features bi-directional multispeed control systems providing means for preventing overdriving in either direction of the system. Moreover, the system may be adapted for external or internal range rate augmentation.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. A ranging system, comprising:
first means for providing signals corresponding to the interval between signals transmitted to a target and corresponding rebound signals from the target including means for providing trigger pulses at an adjustable rate, means connected to the trigger pulse means and responsive to the pulses therefrom for transmitting signals to the target and means for sensing the transmitted signals and the corresponding rebound signals and for providing signals corresponding to the interval between the sensed signals;
means for providing reference signals;
second means for delaying the reference signals and for providing signals after a predetermined interval;
means connected to the first and second means for providing signals corresponding to the difference between said intervals;
a motor connected to the last mentioned means and driven by the signals therefrom for tracking the target;
the means for providing trigger pulses at an adjustable rate coupled to the motor and driven thereby so that the pulse rate is adjusted in accordance with target range; and
means connected to the motor and driven thereby for providing signals corresponding to target range.
2. A system as described by claim 1, including:
means for providing signals corresponding to a predetermined range point;
means connected to the motor and driven thereby for displaying target range; and
means connected to the motor and driven thereby and connected to the predetermined range point signal means and responsive to the signals therefrom for displaying target range to the predetermined range point.

3. A system as described by claim 1, including:
control means for connecting the motor to the interval difference signal means and responsive to the signals therefrom for driving the motor in one direction when the signals are of one sense and for driving the motor in the opposite direction when said signals are of another sense; and means connected to the motor and connected to the control means and responsive to the motor output when said motor is overdriving in the one direction and in the opposite direction for applying a controlling output to the control means whereby said control means is effective for preventing the motor from overdriving.

4. A system as described by claim 1, wherein the means connected to the first and second means for providing signals corresponding to the difference between the intervals includes:
means for providing an output in one sense when one of said intervals is greater than the other, for providing an output in another sense when said one interval is less than the other and for providing a null output when said intervals are equal.

5. A system as described by claim 3 wherein the control means for connecting the motor to the interval difference signal means and responsive to the signals therefrom for driving the motor in one direction when the signals are of one sense and for driving the motor in the opposite direction when said signals are of another sense includes:
means for providing motor drive pulses;
first gating means connected to the motor drive pulse means, to the mootr and to the interval difference signal means, and responsive to the interval difference signal in the one sense for gating predetermined numbers of drive pulses to the motor for driving the motor in the one direction;

second gating means connected to the motor drive pulse means, to the motor and to the interval difference signal means, and responsive to the interval difference signal in the other sense for gating predetermined numbers of drive pulses to the motor for driving the motor in the other direction; and the first and second gating means each including a first oscillator connected to the trigger pulse means for providing a gating pulse having a predetermined pulse width when the pulse rate is above a predetermined value for gating a first predetermined number of drive pulses to the motor, and a second oscillator connected to the trigger pulse means for providing another gating pulse having a lesser predetermined pulse width when the pulse rate is below the predetermined value for gating a second lesser predetermined number of drive pulses to the motor.

References Cited

UNITED STATES PATENTS

| | | | |
|---|---|---|---|
| 2,419,541 | 4/1947 | De Rosa | 343—13 |
| 2,495,740 | 1/1950 | Labin | 343—13 |
| 2,991,467 | 7/1961 | Clarke | 343—13 |

RODNEY D. BENNETT, JR., Primary Examiner

J. G. BAXTER, Assistant Examiner

U.S. Cl. X.R.

343—13R